July 15, 1952

E. P. HOLMES 2,603,684

METAL SHEATHED ELECTRIC CABLE
HAVING HEAT-REFLECTIVE LAYER
Filed July 20, 1948

Inventor:
Edward Percy Holmes,
By his attorneys:
Baldwin, Wight, & Provost

Patented July 15, 1952

2,603,684

UNITED STATES PATENT OFFICE 2,603,684

METAL SHEATHED ELECTRIC CABLE HAVING HEAT-REFLECTIVE LAYER

Edward Percy Holmes, Steeple Aston, England, assignor to Super Tension Cables Limited, Glasgow, Scotland, a company of Great Britain Application July 20, 1948, Serial No. 39,720
In Great Britain July 28, 1947

4 Claims. (Cl. 174—106)

1

This invention relates to insulated electric cables and more particularly to cables of the type provided with a sheath of aluminium, aluminium alloy, copper or other metal whose "paste" temperature is high relative to that of lead.

The usual sheathed cable has an extruded lead sheath and presents no serious manufacturing difficulties. If, however, it is sought to provide a sheathing by extruding aluminium, copper or other metal having a fairly high melting point, or by wrapping tape of such metal in place and then welding it, difficulties are experienced due to charring and damage of the insulating material of the cable by the high temperatures. This constitutes a serious manufacturing difficulty which it is the object of the present invention to avoid. Thus the usual paper insulation or paper and jute filling around the cable conductor, when exposed to a high temperature, is liable to char and as this insulation and filling are subject to electrical stress it is obviously undesirable that they should be subjected to such charring when the cable is subject to excessive temperatures.

According to current manufacturing practice it is known to cover an insulated cable with a sheathing of aluminium, copper or other high melting point metal, and this sheathing is provided on its outer surface with a heat protective layer of metal. The metal may take the form of foil wrapped on from a continuous strip or laid on longitudinally or it may be deposited in place e. g. by a metallisation gun, or it may be in the form of metallised paper or metallised cellulosic material. According to this invention, in order further to increase the protection air spacing is provided between the sheath and the metal layer, and where foil or the like is employed, the foil may be crinkled or provided with upstanding point-like deformations which act as spacers. As an alternative the air spacing may be obtained by providing a heat resisting open-turn spacing winding between the sheath and the metal layer.

Figure 1:
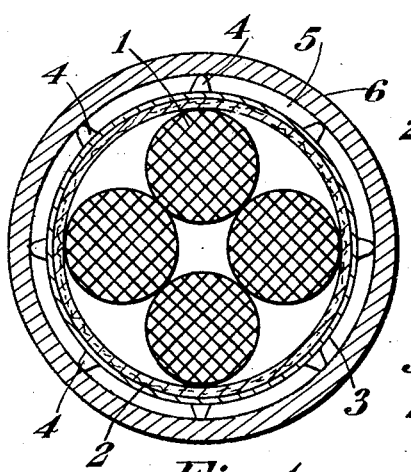
Figure 2:
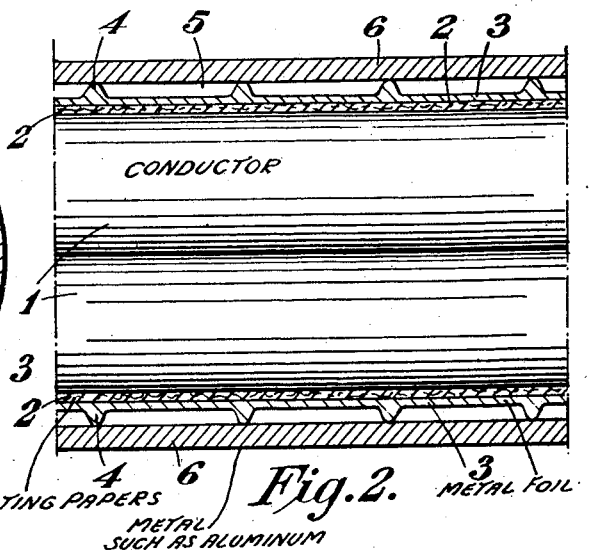
Figure 3:
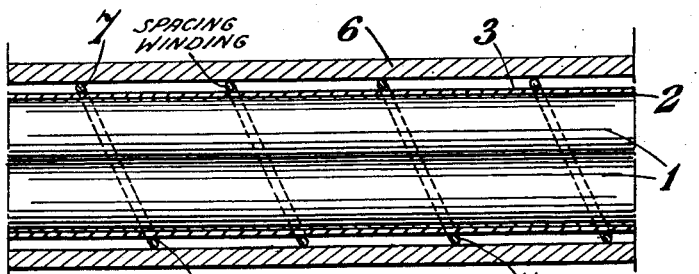
Figure 4:
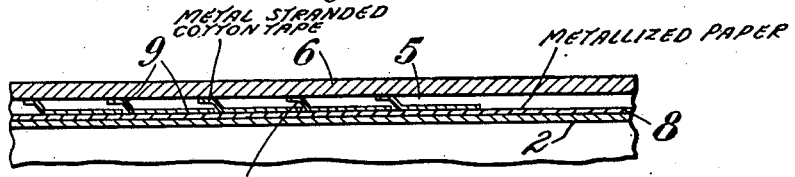
Figure 5:
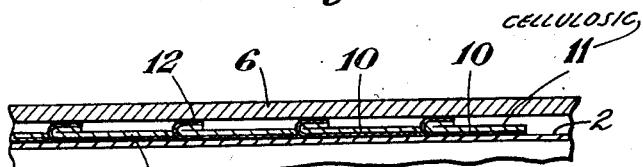

Various forms of the invention are diagrammatically illustrated in the accompanying drawing in which Figure 1 is a transverse section of a four-core cable, Figure 2 a longitudinal section thereof; Figures 3, 4 and 5 are sections similar to Figure 2 but of modified forms. In the various figures of the drawing similar parts have been shown by the same reference number.

Referring to Figures 1 and 2, the conductors 1 are surrounded by the normally provided belting papers 2 and it will, of course, be appreciated that, in order clearly to show the various integers of the cable construction, the parts are not drawn correctly to scale. Around the thus formed insulated cable is wrapped a heat protective layer of metal whose inner surface is in intimate continuous contact with the insulation 2. In this case the said metallic layer consists of foil 3. The opposite or outer surface of foil 3 is crinkled, folded or otherwise formed with a number of upstanding point-like deformations 4 which act as spacers, thus providing a gap 5 between the foil 3 and the cable sheath 6.

In an alternative construction, as will be seen in Figure 3, the gap 5 is provided by the use of a heat resisting open-turn spacing winding 7 between the sheath 6 and the metal layer 3.

A further arrangement is shown in Figure 4 where the metal layer is in the form of a wrapping of metallised paper 8 such for example as aluminium foil backed with paper, and is applied to the cable by winding the covering over the cable in a continuous manner, so that there are no gaps between adjacent turns of the covering, the aluminium foil forming the outer surface of the covering; the said paper backed aluminium foil is utilized for purposes of confining the electric field by providing interposed conductive wire 9 consisting of cotton tape into which are entwined metal strands, which wire provides electrical continuity between the screening foil and the metal sheath. It will be appreciated that the paper backed metal foil acts as the heat reflecting layer, and the gap is maintained by the cotton or cellulosic tape. In the event of charring occurring, then the material which will be charred is the cellulosic tape, which is outside the electric field, and the insulating properties of the cable are not impaired.

In some cases the foil may be apertured but this is not necessary and in general is not preferred. Preferably the metal layer is bright so as to have good heat reflecting qualities.

In an alternative form the covering may be wound upon the cable, the paper layer or layers being so positioned with respect to the conductor that they are outside the field of electrical stress and in order to ensure this the metallised surface of the covering is adequatly bonded to earth.

One method of utilising the covering in this form is shown in Figure 5 and in this arrangement the covering consists of aluminium foil 10 backed with one or more payers of paper or like cellulosic material 11, the aluminium foil along one edge of the paper being doubled back as at 12 so that when the covering is wound upon the cable with the aluminium foil facing towards the conductor or conductors, the outer surface presents a paper or cellulosic surface with a thin surface of aluminium foil along one edge of each turn, the covering being so wound as not to provide any gaps between adjacent turns.

It is to be appreciated that the paper backing is subjected to considerable heat and may become charred. These charred portions, however, are outside the electric field because of the folds in the metallised paper, and no serious effects can result.

What I claim is:

1. An insulated electric cable comprising a conductor; insulation surrounding the conductor; an outer sheathing of metal having a melting point much higher than the melting point of conventional lead sheathing in circumferentially spaced relation to said insulation; and a layer of metal interposed between said insulation and said sheathing at one surface in intimate continuous contact with said insulation and at its opposite surface being heat-reflective and having means maintaining said insulation and said sheathing in spaced relation to provide air spacing between said heat reflective metal and said sheathing, said air spacing enabling the heat reflective property of said metal to be effective.

2. A cable as claimed in claim 1 in which the heat reflective layer is in the form of metallised cellulosic material, the air spacing being provided by a heat resisting open-turn spacing winding between the sheath and the said layer.

3. A cable as claimed in claim 1 in which the air spacing is maintained by providing interposed conductive wire.

4. A cable as claimed in claim 1 in which said opposite surface is bright and has spacers associated therewith engaging the sheathing to provide the air spacing.

EDWARD PERCY HOLMES.

REFERENCES CITED

The following references are of record in the file of this patent:

UNITED STATES PATENTS

| Number | Name | Date |
| --- | --- | --- |
| 1,770,851 | Hayman | July 15, 1930 |
| 1,770,877 | Clark | July 15, 1930 |
| 1,833,798 | Shanklin | Nov. 24, 1931 |
| 1,948,616 | Fischer | Feb. 27, 1934 |
| 2,045,104 | Rosch | June 23, 1936 |
| 2,125,869 | Atkinson | Aug. 9, 1938 |
| 2,308,274 | Frederickson | Jan. 12, 1943 |
| 2,312,506 | Tomlinson et al. | Mar. 2, 1943 |
| 2,446,387 | Peterson | Aug. 3, 1948 |
| 2,447,168 | Dean et al. | Aug. 17, 1948 |

FOREIGN PATENTS

| Number | Country | Date |
| --- | --- | --- |
| 399,066 | Great Britain | Sept. 28, 1943 |

OTHER REFERENCES

A publication entitled "Stainless Steel-sheathed Aerial Cable," by J. J. Moffatt, Electrical Engineer's Journal, Jan. 1944, vol. 36, part 4, page 107 relied upon.

Ser. No. 193,918, Schmitt (A. P. C.), published May 18, 1943.